3,053,851
N-(2-VINYL PHENYL) MALEIMIDE

Elbert C. Ladd, Passaic, N.J., assignor to United States Rubber Company, New York, N.Y., a corporation of New Jersey
No Drawing. Filed Jan. 10, 1961, Ser. No. 81,679
2 Claims. (Cl. 260—326.5)

This invention relates to new chemical compounds, namely N-(2-vinylphenyl)maleamic acid, N-(2-vinylphenyl)maleimide, methods of making said compounds, and use of the latter compound as a vulcanizing agent for natural rubber and synthetic rubbers having high olefinic unsaturation and which are conventionally vulcanized with sulfur, such as SBR (styrene-butadiene copolymer rubber).

I have found that my new chemicals can be prepared by a two-step process starting with 2-vinylaniline.

Step 1 consists of reacting 2-vinylaniline with maleic anhydride. The reaction may be represented as follows:

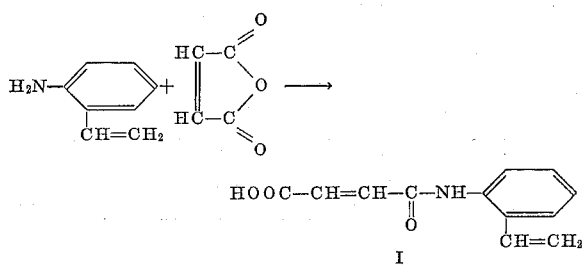

This reaction is most easily carried out by bringing together approximately equi-molar amounts of the two reagents in an inert solvent for both. A most convenient solvent is benzene which is a good solvent for both reactants but a poor solvent for the reaction product. The reaction is most conveniently carried out at ambient temperatures. The product separates out as a yellow solid and can be purified by recrystallization from benzene.

Step 2 effects dehydration and ring formation in the maleamic acid moiety. The reaction may be carried out by heating the N-(2-vinylphenyl)maleamic acid with a considerable molar excess (over the maleamic acid) of acetic anhydride and a suitable amount of sodium acetate at an elevated temperature of say 60–80° C. for a suitable period of time. Typically, the molar ratio of acetic anhydride to the maleamic acid ranges from 3:1 up to 10:1 and the molar ratio of acetic anhydride to sodium acetate ranges from 1:1 up to 7.57:1. The reaction mixture is poured into water whereupon an oily layer is formed. This oily layer can be dissolved in benzene. Addition of cyclohexane to the resulting solution causes N-(2-vinylphenyl)maleimide to crystallize. The product can be purified by repeated recrystallization from benzene. The reaction in Step 2 can be portrayed as follows:

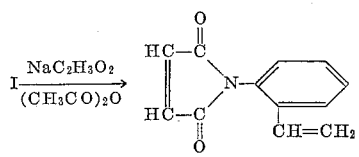

The new N-(2-vinylphenyl)maleimide compound has a variety of uses. It will serve as a vulcanizing agent for rubber, and is copolymerizable with a variety of ethylenically unsaturated monomers, such as styrene, acrylates, methacrylates and the like.

I have found that natural and synthetic rubbers having high olefinic unsaturation can be readily vulcanized with N-(2-vinylphenyl)maleimide provided a thiazole-type accelerator is used. The rubber is compounded in the conventional way with from 2 to 5 phr. (parts per hundred parts by weight of rubber) of the new chemical with from 1 to 2 phr. of a thiazole-type accelerator (any rubber vulcanization accelerator having the thiazyl grouping) such as 2,2'-dibenzothiazyl disulfide with other conventional compounding agents, typically carbon black and an oily plasticizer, after which the stock is shaped and vulcanized in the manner well-known for the vulcanization of rubber.

The rubbers which are operable in this invention are the natural and the synthetic rubbers which have high olefinic unsaturation and which are conventionally vulcanized with sulfur. Such synthetic rubbers are the homopolymers of aliphatic conjugated diolefin hydrocarbons and copolymers of such diolefins with monoolefinic compounds copolymerizable therewith. Such monoolefins include styrene; alpha-methylstyrene; p-methylstyrene; alpha, p-dimethylstyrene; acrylic and methacrylic nitriles, amides, acids and esters; vinyl pyridines; fumaric esters; methylenemalonic esters; vinylidene chloride; methyl vinyl ketone; and methyl isopropenyl ketone. Mixtures of such monoolefinic compounds can also be copolymerized with the diolefin. The term "high olefinic unsaturation" here connotes an amount of unsaturation on the order of that occurring in Hevea rubber. The copolymers must contain copolymerized therein at least about 35% of the diolefin hydrocarbon. The butyl rubbers, which are elastomers made by an ionic polymerization process, from a major amount of an isoolefin and a minor amount of a conjugated diolefin hydrocarbon in an organic solvent, are not curable with maleimides, and are excluded from the scope of the invention.

The synthetic rubbers referred to may be either emulsion polymers or stereospecific (or stereoregular) homopolymers and copolymers of aliphatic conjugated diolefin hydrocarbons, of which the polymers of greatest commerical interest now are cis-1,4-polyisoprene (often called synthetic natural rubber) and cis-1,4-polybutadiene.

The following examples illustrate the invention:

Example I 59.5 grams (0.5 mol) of freshly distilled 2-vinylaniline was dissolved in 300 ml. of benzene and added rapidly to a 1 l. flask containing a solution of 49 grams (approximately 0.5 mol) of maleic anhydride in 200 ml. of benzene. 10.5 grams of a yellow solid product was formed. The product was recrystallized from benzene and had a melting range of 115°–120° C. The material has been identified as N-(2-vinylphenyl)maleamic acid.

Analysis for $C_{12}H_{11}NO_3$:

|  | Calculated | Found |
|---|---|---|
| Percent Nitrogen | 6.45 | 6.26 |

43.4 grams (0.2 mol) of N-(2-vinylphenyl)maleamic acid was added to a 250 ml. breaker containing 9.0 grams (0.11 mol) of sodium acetate and 85 grams (0.8333 mol) of acetic anhydride. The reaction mixture was carefully stirred on a hot plate at 70° C. for 20 minutes. At the end of the heating period the mixture was poured into water to produce an oil. The oily product was taken up in benzene and caused to crystallize by the addition of cyclohexane. Additional recrystallizations from benzene resulted in 8.5 grams of product having a melting point of 86°–88° C. The product is light yellow in color and identified as N-(2-vinylphenyl)maleimide. Analysis for $C_{12}H_9NO_2$:

|  | Calculated | Found |
|---|---|---|
| Percent Nitrogen | 7.04 | 6.75 |

*Example II*

This example demonstrates the use of N-(2-vinylphenyl)maleimide as a vulcanizing agent when accelerated with a thiazole-type accelerator. A styrene-butadiene copolymer rubber with a styrene content of about 20 percent (SBR 1500) was compounded with 50 parts by weight, per hundred of rubber, of a high abrasion furnace black, marketed under the registered trademark of "Philblack O"; 7.5 parts by weight of "Circosol 2XH," a naphthenic type oil * (Sun Oil Co.); 1.5 parts by weight of 2,2'-dibenzothiazyl disulfide; and 3.5 parts by weight, per hundred of rubber, N-(2-vinylphenyl)-maleimide. By way of comparison a similar sample was prepared by replacing on an equi-molar basis the N-(2-vinylphenyl)-maleimide with N-phenylmaleimide, a vulcanizing agent which was known prior to my invention. Compounding was done in the conventional manner. The rubber, black and oil were assembled and mixed in the Banbury for 10 minutes. Discharge temperature was 275–300° F. The remainder of the ingredients was added on a cool two-roll mill. Both samples were cured in a press at 320° F. and tested by the conventional testing methods used for rubber.

| Stock | Parts by Weight | |
|---|---|---|
|  | 1 | 2 |
| SBR 1500 | 100 | 100 |
| "Philblack O" carbon black | 50 | 50 |
| "Circosol 2XH" | 7.5 | 7.5 |
| N-phenylmaleimide | 3.0 |  |
| N-(2-vinylphenyl)maleimide |  | 3.5 |
| 2,2'-Dibenzothiazyl disulfide | 1.5 | 1.5 |

The following table shows the results of tests on the cured samples.

| Physical Properties | Time of Cure (minutes) | | |
|---|---|---|---|
| Tensile Strength (p.s.i.) | 15' | 2,340 | 2,400 |
|  | 30' | 2,630 | 2,150 |
| Elongation at Break (Percent) | 15' | 470 | 395 |
|  | 30' | 500 | 350 |
| Modulus at 300% (p.s.i.) | 15' | 1,100 | 1,550 |
|  | 30' | 1,100 | 1,675 |

Having thus described my invention, what I claim and desire to protect by Letters Patent is:
1. N-(2-vinylphenyl)maleamic acid.
2. N-(2-vinylphenyl)maleimide.

References Cited in the file of this patent

UNITED STATES PATENTS 2,384,239    Dorough    Sept. 4, 1945

---

*A pale green, transparent, heavy, viscous, odorless, naphthenic petroleum hydrocarbon oil of high molecular weight and low volatility, specific gravity 0.94; Saybolt Universal viscosity at 100° F., about 2000 seconds.